United States Patent [19]

Grawey

[11] 4,211,592
[45] Jul. 8, 1980

[54] METHOD OF BUILDING A CLOSED TUBE-TIRE

[75] Inventor: Charles E. Grawey, Peoria, Ill.

[73] Assignee: Caterpillar Tractor Co., Peoria, Ill.

[21] Appl. No.: 933,314

[22] Filed: Aug. 14, 1978

[51] Int. Cl.² .......................... B29H 3/00; B29H 17/00
[52] U.S. Cl. .................................. 156/123 R; 264/313; 264/317; 264/326; 425/49; 425/DIG. 12
[58] Field of Search .................... 156/118, 121, 123 R, 156/125, 110 R; 264/279, 313, 317, 326, 328; 249/69; 425/49, 542, 555, DIG. 12

[56] References Cited
U.S. PATENT DOCUMENTS

| | | | |
|---|---|---|---|
| 1,405,470 | 2/1922 | Wheatley | 156/123 |
| 2,724,425 | 11/1955 | Ostling | 156/123 |
| 3,606,921 | 9/1971 | Grawey | 152/354 |
| 3,776,792 | 12/1973 | Grawey | 156/121 X |
| 3,969,050 | 7/1976 | Anderson | 425/40 |

*Primary Examiner*—John E. Kittle
*Attorney, Agent, or Firm*—John W. Grant

[57] ABSTRACT

A method of building a closed tube-tire includes constructing a green tire carcass (13) on a disintegratable core (17) and curing the tire carcass (13) in a curing mold (10) having two halves (11,12) which are movable between opened and closed positions. The green tire carcass (13) is intentionally constructed undersized so that a space (18) exists between the green tire carcass (13) and the curing mold (10) to prevent the core (17) from being cracked or crushed when the halves are closed around the tire carcass (13).

2 Claims, 2 Drawing Figures

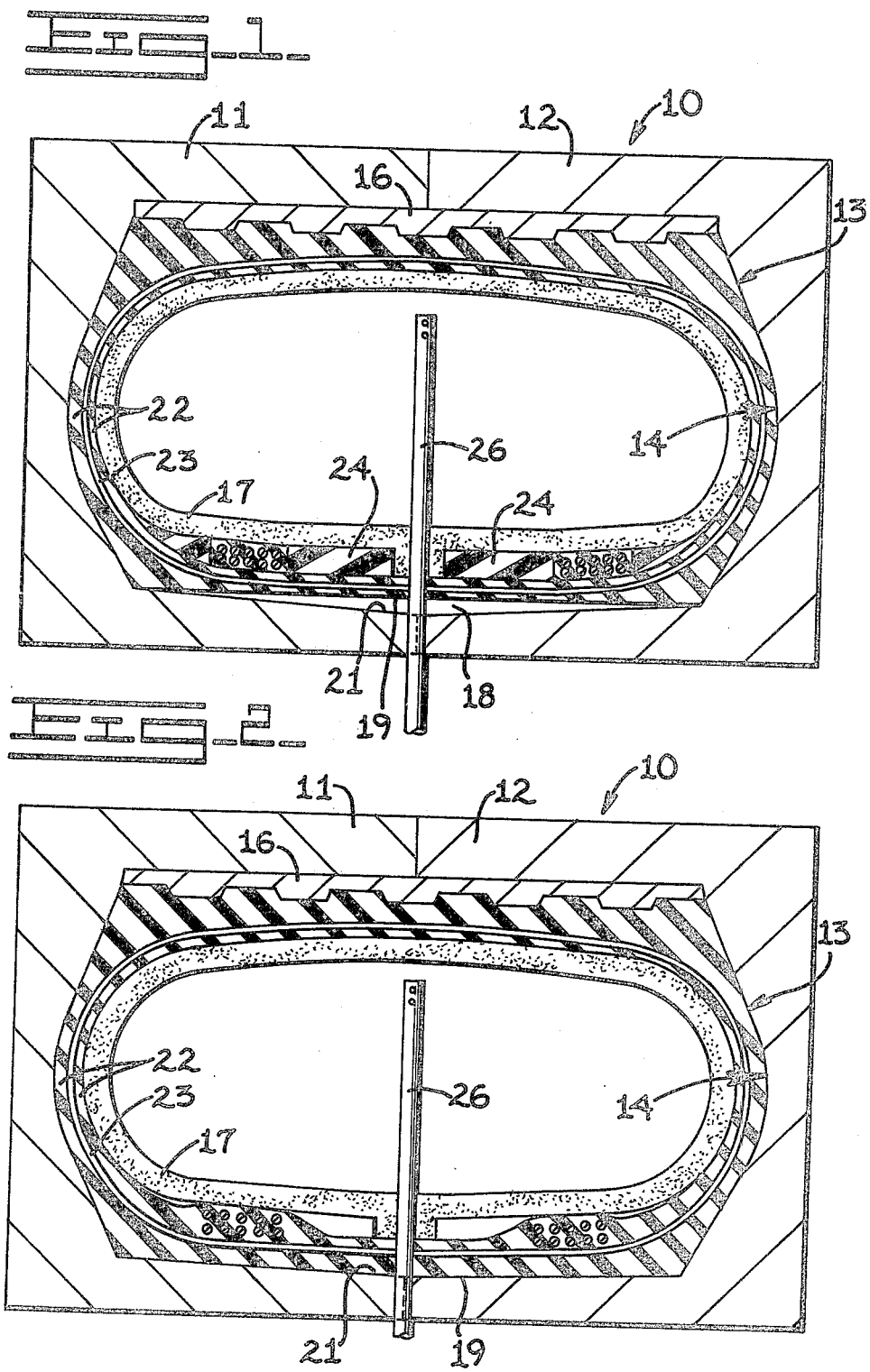

METHOD OF BUILDING A CLOSED TUBE-TIRE

TECHNICAL FIELD

This invention relates to a method of building a tube-tire such as those described in U.S. Pat. No. 3,606,921, issued to C. E. Grawey on Sept. 21, 1971.

BACKGROUND ART

One example of an apparatus for carrying out at least some of the method steps of the present invention is shown in U.S. Pat. No. 3,969,050, issued to A. W. Anderson on July 13, 1976.

DISCLOSURE OF INVENTION

In one aspect of the present invention, in a method of building a tube-tire, a curing mold is provided with a cavity sized to match the size of the finished tire and a green tube-tire carcass is constructed from uncured elastomer and reinforcing elements. The carcass is sized so that the diameter of its inner circumferential wall is greater than the diameter of the inner circumferential wall of the finished tube-tire. An amount of uncured elastomer in excess of that required for forming the inner circumferential wall of the finished tube-tire is positioned at the inner surface of the circumferential wall of the green tube-tire carcass. The green tube-tire carcass is placed in the cavity of the curing mold, the curing mold heated and hot fluid under pressure is directed into the tube-tire carcass subsequent to the step of placing the tire carcass in the cavity.

Tube-tires are currently manufactured by building a green tube-tire carcass from uncured elastomer and reinforcing elements on a disintegrateable core and then placing the green tube-tire carcass with the core therein into a curing mold for curing the elastomer. Heretofore, the green tube-tire carcass has been the same size as the finished tube-tire and hence substantially the same size as the cavity in the curing mold. One of the problems encountered with this procedure has been that the size of the tube-tire carcass must be closely controlled. If the green tube-tire carcass is oversize, the disintegratable core could be crushed as the mold is closed around the green tube-tire carcass. If the green tube-tire carcass is undersize, the finished tire may have a weak spot therein due to insufficient elastomer.

The present invention eliminates this problem by intentionally constructing the green tube-tire carcass undersize and providing an excess of uncured elastomer for flowing into the space between the undersized tube-tire carcass and the mold wall during the curing step.

BRIEF DESCRIPTION OF THE DRAWINGS

FIG. 1 is a diagrammatic cross-sectional view showing the size relationship between the green tube-tire carcass and the curing mold before the curing step.

FIG. 2 is a diagrammatic sectional view similar to FIG. 1 but showing the size relationship between the tube-tire and the mold after curing.

BEST MODE FOR CARRYING OUT THE INVENTION

One example apparatus for carrying out certain method steps of the present invention is fully described in U.S. Pat. No. 3,969,050, issued to A. W. Anderson on July 13, 1976. One example of a method of constructing a tire on a disintegratable or soluble core is disclosed in U.S. Pat. No. 3,776,792, issued to C. E. Grawey on Dec. 4, 1973.

An apparatus for carrying out certain method steps of the present invention is diagrammatically shown in FIG. 1 and includes a curing mold 10 having first and second mold halves 11,12 which are movable between a first position at which the mold halves are spaced apart sufficient for moving a green tube-tire carcass 13 therebetween and a second position at which the mold halves are in abutment with one another forming an annular mold cavity 14 therein. As described in U.S. Pat. No. 3,776,792, an annular tread ring 16 encircles the tube-tire carcass 13 and cooperates with mold halves 11,12 to form the outer circumferential wall of mold cavity 14, the mold cavity being the size and configuration the finished tube-tire will have. The green tube-tire carcass is constructed on a disintegratable or soluble core 17. The green tube-tire carcass is intentionally constructed undersize so that it is smaller in cross section than the cross section of the cavity. Thus a space 18 is provided between the inner circumferential wall 19 of the green tube-tire carcass and the adjacent surface 21 of the mold cavity.

The method of building a tube-tire includes the known steps of providing the curing mold 10 with mold cavity 14 of a size and configuration to match the finished tube-tire; constructing the green tube-tire carcass by sequentially laying of layers of uncured elastomer 22 and at least one ply of reinforcing elements 23 on the disintegratable core 17 and sizing the green tube-tire carcass so that the diameter of its inner circumferential wall 19 is greater than the diameter of the inner circumferential wall 13 of the finished tube-tire; placing the green tube-tire carcass 13 in the mold cavity 14 of the curing mold; and heating the mold to a preselected temperature and circulating heated fluid under pressure through the disintegratable core and inside of the carcass thereby curing the uncured elastomer. The method of the present invention further includes constructing the green tube-tire carcass undersize, i.e., it is smaller in cross section than the cross section of the finished tube-tire, so that the space 18 exists between the inner circumferential wall 19 of the green tube-tire carcass and the adjacent surface 21 of the mold cavity, positioning an excess of uncured elastomer 24 at the inner surface of the inner circumferential wall, and flowing heated elastomer into said space, as illustrated in FIG. 2, under the influence of the heated pressurized fluid during the step of curing the green tube-tire carcass.

The step of circulating heated fluid under pressure includes inserting a pair of tubes one shown at 26 through aligned holes in the curing mold 10, green tube-tire carcass 13, and disintegratable core 17. As shown in U.S. Pat. No. 3,969,050, the tubes are preferably diametrically opposite one another.

Although the disintegratable core 17 is shown intact in FIG. 2, it can either be disintegrated by the heated fluid circulated therethrough during the curing or it can be disintegrated and removed from the finished tube-tire in a separate operation.

The curing times and temperatures used are common to the rubber curing art and are not critical or unique to the practice of the present invention. For completeness, however, it should be mentioned that typically curing temperatures for large earthmover tires fall within the range from about 120° C. to 160° C. for times that fall within the range from about 100 minutes to about 300 minutes, generally longer times being used for lower temperatures and shorter times for higher temperatures.

Other aspects, objects and advantages of this invention can be obtained from a study of the drawings, the disclosure and the appended claims.

What is claimed is:

1. In a method of building a tube-tire in which a green tube-tire carcass (13) is constructed by laying up layers of uncured elastomer (22) and at least one ply of reinforcing elements (23) on a disintegratable core (17) and then placing the green tube-tire carcass (13) into a mold cavity (14) of a curing mold (10), heating the mold (10) to a preselected temperature and circulating heated fluid under pressure through the disintegratable core (17) and inside of the carcass thereby curing the elastomer, the improvement comprising:

constructing the green tube-tire carcass (13) so that it is smaller in cross section than a cross section of the mold cavity (14) and providing a space (18) between the inner circumferential wall (19) of the green tube-tire carcass (13) and an adjacent surface (21) of the mold cavity (14);

positioning an excess of uncured elastomer (24) at the inner surface of the inner circumferential wall (19); and flowing heated elastomer into said space under the influence of the heated fluid circulated under pressure through the inside of the carcass during the step of curing the uncured elastomer.

2. A method of building a tube-tire, comprising the steps of:

providing a curing mold (10) with a cavity (14) sized to match the size of the finished tube-tire;

constructing a green tube-tire carcass (13) from layers of uncured elastomer (22) and reinforcing elements (23) and sizing the green tire carcass (13) so that the diameter of its inner circumferential wall (19) is greater than the diameter of the inner circumferential wall of the finished tube-tire;

positioning an amount of uncured elastomer (24) at the inner surface of the circumferential wall (19) of the green tube-tire carcass (13) in excess of that required for forming the inner circumferential wall of the finished tube-tire;

placing the green tube-tire carcass (13) in the mold cavity (14) of the curing mold;

heating the curing mold (10); and directing heated fluid under pressure into the green tube-tire carcass (13) subsequent to the step of placing the green tube-tire carcass (13) in the cavity (14).

* * * * *